(12) United States Patent
Tsuchiya

(10) Patent No.: US 9,740,159 B2
(45) Date of Patent: Aug. 22, 2017

(54) POWER SUPPLY DEVICE, IMAGE FORMING APPARATUS AND METHOD OF CONTROLLING POWER SUPPLY DEVICE

(71) Applicant: KYOCERA Document Solutions Inc., Osaka (JP)

(72) Inventor: Masaki Tsuchiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/217,576

(22) Filed: Jul. 22, 2016

(65) Prior Publication Data

US 2017/0023905 A1    Jan. 26, 2017

(30) Foreign Application Priority Data

Jul. 24, 2015    (JP) .................................. 2015-147001

(51) Int. Cl.
*G05F 1/56* (2006.01)
*G03G 15/00* (2006.01)
*H02M 1/32* (2007.01)
*H02M 3/156* (2006.01)

(52) U.S. Cl.
CPC ............. *G03G 15/80* (2013.01); *H02M 1/32* (2013.01); *H02M 3/156* (2013.01)

(58) Field of Classification Search
CPC ................................ G05F 1/56; H02M 3/156
USPC ......................................... 323/280–285, 315
See application file for complete search history.

(56) References Cited

U.S. PATENT DOCUMENTS

| 7,279,874 | B2 * | 10/2007 | Masuda ................... | H02M 1/32 323/282 |
| 8,970,790 | B2 * | 3/2015 | Murakami ............... | H04N 5/63 323/271 |
| 2012/0032660 | A1 * | 2/2012 | Nakamura ............ | H02M 3/156 323/288 |
| 2012/0049829 | A1 * | 3/2012 | Murakami ............... | H02M 1/32 323/288 |
| 2014/0070781 | A1 * | 3/2014 | Yanagida .................. | G05F 1/10 323/271 |
| 2015/0137776 | A1 * | 5/2015 | Thomas .............. | H02M 3/1588 323/271 |

FOREIGN PATENT DOCUMENTS

JP        2005-168157 A      6/2005

* cited by examiner

*Primary Examiner* — Adolf Berhane
*Assistant Examiner* — Nusrat Quddus
(74) *Attorney, Agent, or Firm* — Stein IP, LLC

(57) ABSTRACT

A power supply device includes: a DC-DC converter that includes a switching element, a coil, a capacitor and a controller which controls the turning on and off of the switching element; a detection circuit to which an output voltage of the DC-DC converter is input and which outputs a detection signal whose level is changed depending on whether or not the output voltage is less than a reference voltage; and a power supply control circuit which stops the DC-DC converter when the number of times the level of the detection signal is changed within a predetermined detection period is equal to or more than a specified number of times.

13 Claims, 6 Drawing Sheets

POWER SUPPLY DEVICE, IMAGE FORMING APPARATUS AND METHOD OF CONTROLLING POWER SUPPLY DEVICE

This application is based upon and claims the benefit of priority from the corresponding Japanese Patent Application No. 2015-147001 filed on Jul. 24, 2015, the entire contents of which are incorporated herein by reference.

BACKGROUND

The present disclosure relates to a power supply device that includes a DC-DC converter and a method of controlling such a power supply device. The present disclosure also relates to an image forming apparatus that includes the power supply device.

In an image forming apparatus such as a printer, a multifunctional peripheral, a copying machine or a facsimile machine, one or a plurality of printed circuit boards in which various circuits, elements and electronic components are incorporated are provided. For these circuits, elements and electronic components, the magnitudes (input voltage ranges) of drive voltages are individually and previously determined. A plurality of types of voltages may need to be input to one circuit, one element, one electronic component or one printed circuit board. Hence, within the image forming apparatus, a plurality of types of voltages need to be generated. In order to generate necessary voltages, a DC-DC converter is provided in the image forming apparatus. A DC-DC converter below is known.

Specifically, the DC-DC converter is known which includes a switching element, an inductor, a diode, an output capacity and a control circuit and in which when an output voltage is lowered beyond a predetermined voltage value, an inductor value is decreased with an inductor switching means. In this configuration, the DC-DC converter does not degrade performance in a stably operated state, and decreases the time during which an inductor current is increased only when a load current is increased and the output voltage is lowered, and thus the undershoot of the output voltage is reduced.

In the DC-DC converter, an overcurrent protection circuit may be provided. The overcurrent protection circuit detects that a current flowing through the DC-DC converter exceeds a predetermined upper limit value by a factor such as an increase in the load current. When the current exceeds the upper limit value, the overcurrent protection circuit stops the DC-DC converter.

The elements and components of the DC-DC converter which do not break down even when the current of the upper limit value flows through them are used (which correspond to the upper limit value), and thus a failure and a damage in the DC-DC converter caused by an overcurrent are unlikely to occur. However, when the elements and components of the DC-DC converter are selected so as to correspond to the upper limit value of the current, the elements and components may be larger than necessary and may exceed the specifications.

Specifically, when a coil is selected so as to correspond to the upper limit value of a current which flows through the DC-DC converter, in terms of the magnitude of a current supplied to a load (a current value at the time of an actual operation), the coil may be larger than necessary and may be expensive. A coil in which a current value (temperature increase allowable current value) determined such that when a current beyond this current is passed, a damage caused by heating occurs is equal to or more than the upper limit value and a coil in which a current value (direct-current superimposition allowable current value) where the lowering of an inductance is increased is equal to or more than the upper limit value may be larger than necessary in terms of the output current value of the DC-DC converter at the time of the actual operation. When a coil is selected so as to correspond to the upper limit value of a current which flows through the DC-DC converter, this increases the size of the DC-DC converter itself, the size of an apparatus including the DC-DC converter and the manufacturing cost. In the following description, any one of the "temperature increase allowable current value" and the "direct-current superimposition allowable current value" or one of them which is lower is referred to as an "allowable current value".

A coil whose allowable current value is lower than the upper limit value of the current which flows through the DC-DC converter and which corresponds to the magnitude of an actual current supplied by the DC-DC converter to a load (the current value at the time of the actual operation) may be adopted so that the size and cost of the coil are prevented from being increased.

Here, when a state where the current which flows through the coil of the DC-DC converter is high (the load current is high) is continued for a long period of time, the temperature of the coil is increased. In this way, the inductance is lowered, and thus a current easily flows. When the temperature of the coil is increased as a current exceeding the allowable current value is passed, the DC-DC converter is preferably stopped. However, in a case where a coil (coil whose allowable current value is lower than the upper limit value of the current flowing through the DC-DC converter) which corresponds to the current value at the time of the actual operation is adopted, when an output current value is equal to or less than the upper limit value, the function of stopping the DC-DC converter with the overcurrent protection circuit does not work. Hence, disadvantageously, when the coil which corresponds to the current value at the time of the actual operation is adopted, even in a state where the temperature of the coil is significantly increased and where the operation of the DC-DC converter needs to be stopped, it is likely that the overcurrent protection circuit does not stop the DC-DC converter.

The known technology described above is not related to a problem in which the coil that corresponds to the current value at the time of the actual operation is adopted as the coil of the DC-DC converter. Hence, it is impossible to solve the above problem.

SUMMARY

A power supply device according to one aspect of the present disclosure includes a DC-DC converter, a detection circuit and a power supply control circuit. The DC-DC converter includes a switching element which is connected to a power supply, a coil which is connected to an output of the switching element, a capacitor in which one end is connected to the coil and in which the other end is connected to a ground and a controller which controls the turning on and off of the switching element to control an output voltage that is a voltage between the coil and the capacitor. The output voltage is input to the detection circuit, and the detection circuit outputs a detection signal whose level is changed depending on whether or not the output voltage is less than a reference voltage. The detection signal is input to the power supply control circuit, and the power supply control circuit stops the DC-DC converter when the number of times the level of the detection signal is changed within a predetermined detection period is equal to or more than a specified number of times.

An image forming apparatus according to another aspect of the present disclosure includes the power supply device described above.

A method of controlling a power supply device according to another aspect of the present disclosure, includes: connecting a switching element to a power supply; connecting a coil to an output of the switching element; connecting one end of a capacitor to the coil and connecting the other end to a ground; controlling the turning on and off of the switching element to control an output voltage that is a voltage between the coil and the capacitor; changing the level of a detection signal depending on whether or not the output voltage is less than a reference voltage; and stopping the DC-DC converter including the switching element, the coil and the capacitor when the number of times the level of the detection signal is changed within a predetermined detection period is equal to or more than a specified number of times.

Further features and advantages of the present disclosure will become apparent from the description of embodiments given below.

DETAILED DESCRIPTION

In the present disclosure, when a coil (coil whose allowable current value is lower than a current value at which an overcurrent protection circuit functions) which corresponds to a current value at the time of an actual operation is selected, an overload in the coil is accurately detected before the overcurrent protection circuit functions, and a DC-DC converter is stopped and protected. An image forming apparatus including a power supply device 1 according to an embodiment of the present disclosure will be described below with reference to FIGS. 1 to 8. A description will be given using a printer 100 as an example of the image forming apparatus. Individual elements such as configurations and arrangements described in the present embodiment do not limit the scope of the disclosure, and are simply examples of the description.

(Outline of Image Forming Apparatus)

Figure 1:
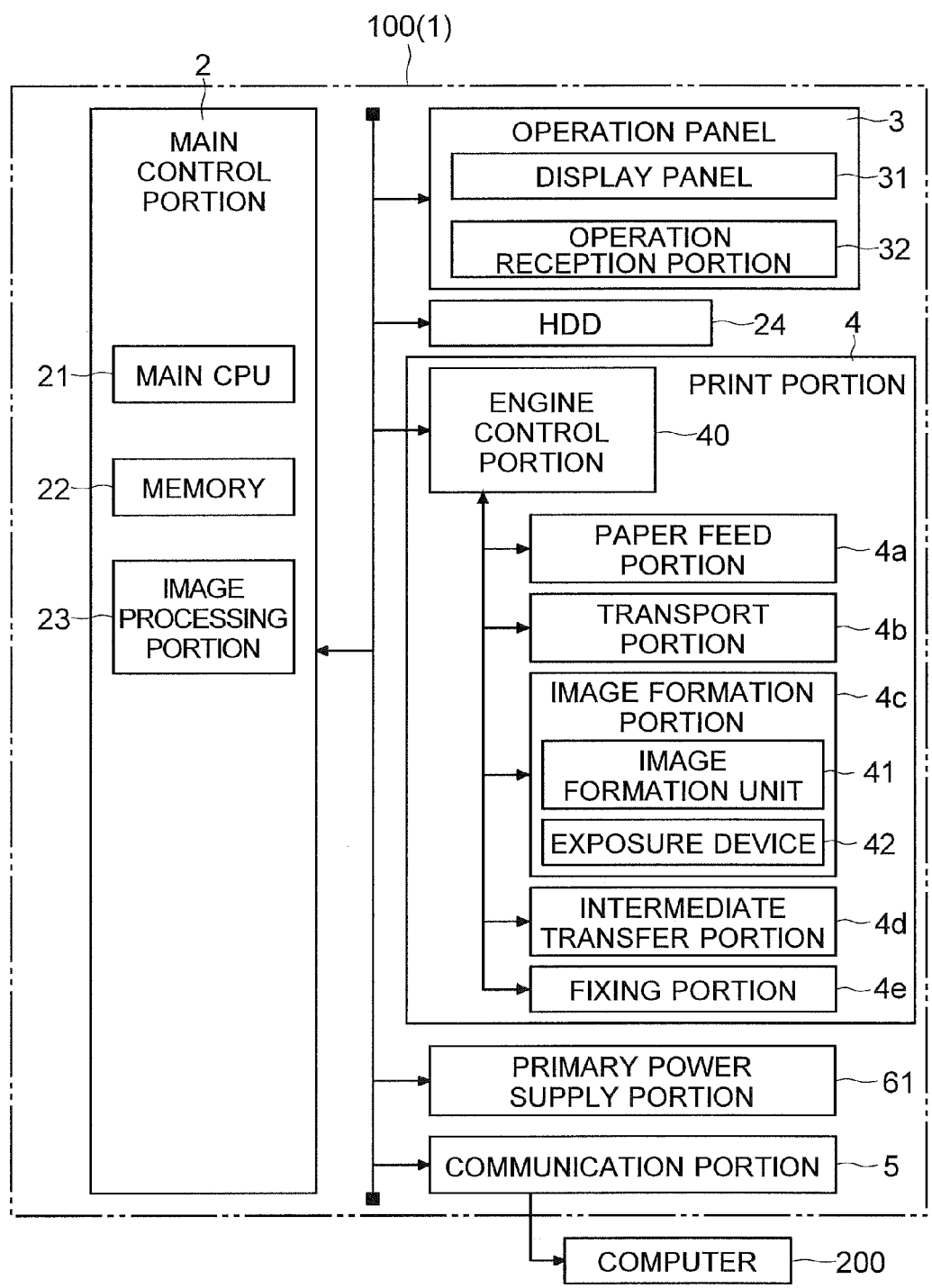
FIG. 1 is a diagram showing an example of a printer according to an embodiment.

The printer 100 according to the embodiment will first be described with reference to FIG. 1. As shown in FIG. 1, the printer 100 includes a main control portion 2 (main control printed circuit board). The main control portion 2 comprehensively controls the operation of the entire apparatus, and controls the individual portions of the printer 100. In the main control portion 2, a main CPU 21 is provided as a central processing unit. The main control portion 2 implements a memory 22, such as a ROM or a RAM, which stores control programs and data and a circuit, such as an image processing portion 23, which performs image processing necessary for printing (details of which will be described later).

The main control portion 2 is connected to an operation panel 3 such that the main control portion 2 can communicate with the operation panel 3. The operation panel 3 includes a display panel 31 which displays a setting screen, the state of the printer 100 and a message. The main control portion 2 controls the display of the display panel 31. The operation panel 3 includes an operation reception portion 32, such as a touch panel or hard keys, which receives an operation by a user. The main control portion 2 recognizes the details of a setting operation performed on the operation reception portion 32. Then, the main control portion 2 controls the printer 100 such that the operation is performed according to the setting by the user.

The printer 100 includes a large capacity storage device such as a HDD 24. Instead of the HDD 24, an SSD may be used. The main control portion 2 is connected to the HDD 24 such that the main control portion 2 can communicate with the HDD 24. The main control portion 2 reads, among image data, programs and various types of control data, necessary information and stores it in the memory.

The printer 100 includes a print portion 4. The print portion 4 includes an engine control portion 40, a paper feed portion 4a, a transport portion 4b, an image formation portion 4c, an intermediate transfer portion 4d and a fixing portion 4e. The engine control portion 40 actually controls print related processing such as paper feed, sheet transport, the formation of a toner image, transfer and fixing. The engine control portion 40 and the main control portion 2 are connected such that they communicate with each other. The main control portion 2 provides, to the engine control portion 40, a print instruction, the details of a print job and image data used for printing. The engine control portion 40 receives the instruction to control the paper feed portion 4a, the transport portion 4b, the image formation portion 4c, the intermediate transfer portion 4d and the fixing portion 4e. Specifically, the engine control portion 40 rotates various type of rotation members related to paper feed, transport, image formation, transfer and fixing to control the printing.

The paper feed portion 4a supplies sheets used for printing one by one. The transport portion 4b transports the supplied sheet through the image formation portion 4c, the intermediate transfer portion 4d and the fixing portion 4e to an ejection tray (not shown). The image formation portion 4c forms a toner image which is placed on the sheet transported by the transport portion 4b. The printer 100 includes an exposure device 42 and a plurality of image formation units 41 (corresponding to color printing). Each of the image formation units 41 includes members and devices such as a photosensitive drum, a charging device and a development device. Each of the image formation units 41 forms the toner image of a different color. The exposure device 42 scans and exposes the photosensitive drums based on image data. The engine control portion 40 controls the operations of the image formation units 41 and the exposure device 42.

The intermediate transfer portion 4d receives the primary transfer of the toner image of the color formed in the photosensitive drum of each of the image formation units 41 and secondarily transfers the toner image to the sheet to be transported. The fixing portion 4e fixes, to the sheet, the toner image transferred to the sheet. The engine control portion 40 controls transfer and fixing. The transport portion 4b ejects, to the ejection tray, the sheet to which the toner image is fixed.

The printer 100 includes a communication portion 5 (external communication interface). The communication portion 5 is connected to a computer 200 such as a PC or a server such that the communication portion 5 can communicate with the computer 200. The communication portion 5 includes not only a connector but also circuits such as a communication control CPU and a chip. The communication portion 5 receives print data from the computer 200. The print data includes data indicating the details of printing such as image data and data indicating settings on printing. The main control portion 2 makes the printer 100 perform printing based on the print data.

The main control portion 2 is connected to a primary power supply portion 61 incorporated in the printer 100 such that the main control portion 2 can communicate with the primary power supply portion 61, and controls the operation of the primary power supply portion 61.

(Power Supply System)

Figure 2:
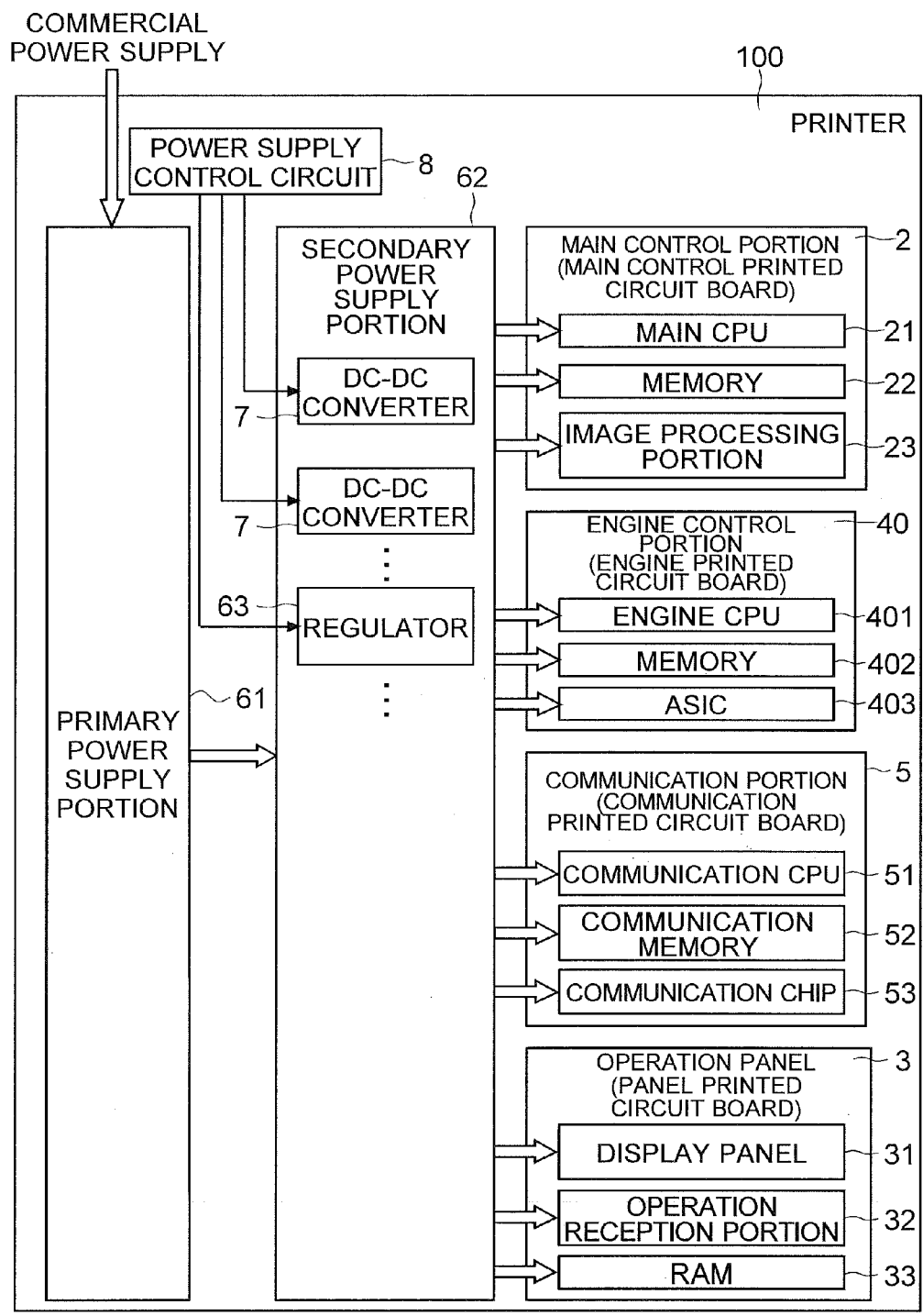
FIG. 2 is a diagram showing an example of the power supply system of the printer according to the embodiment.

An example of a power supply system in the printer 100 according to the embodiment will then be described with reference to FIG. 2. In FIG. 2, the flow of power is indicated by white-solid arrows.

As shown in FIG. 2, the printer 100 according to the embodiment includes the primary power supply portion 61 and a secondary power supply portion 62. The primary power supply portion 61 is connected with a power supply cable (not shown) to a commercial power supply. The primary power supply portion 61 is a switching power supply which includes a rectifier circuit, a transformer, a switching element and a smoothing circuit. When the commercial power supply is connected to the primary power supply portion 61, the primary power supply portion 61 outputs a direct-current voltage. The primary power supply portion 61 generates, for example, DC 24V for motor drive. The illustration of a motor drive voltage wiring will be omitted for convenience.

The secondary power supply portion 62 generates a direct-current voltage based on the voltage generated by the primary power supply portion 61. The secondary power supply portion 62 generates voltages necessary for operating devices, such as a CPU, a memory, a circuit and an element, which are provided in each printed circuit board. The range of the voltage value which needs to be supplied is determined for each of the CPU, the memory, the circuit and the element. The secondary power supply portion 62 generates a plurality of types of voltages and supplies them to the individual printed circuit boards of the printer 100.

Within the main control portion 2, devices (elements, components, circuits and various types of ICs) such as the main CPU 21, the memory 22 and the image processing portion 23 are provided. The image processing portion 23 includes an image processing dedicated circuit such as an ASIC and an image processing memory. In the main control portion 2, voltages necessary for driving the devices such as the main CPU 21, the memory 22 and the image processing portion 23 may be different.

Within the engine control portion 40, an engine CPU 401, an engine memory 402 which includes a ROM or a RAM that stores control programs and data and an ASIC 403 (integrated circuit which is designed and manufactured for a print processing application) are provided. Even in the engine control portion 40, voltages necessary for driving the devices (elements, components, circuits and various types of ICs) such as the engine CPU 401, the engine memory 402 and the ASIC 403 may be different.

The communication portion 5 includes a communication CPU 51, a communication memory 52 which includes a ROM or a RAM that stores communication programs and a communication chip 53. Even in the communication portion 5, voltages necessary for driving the devices (elements, components, circuits and various types of ICs) such as the communication CPU 51, the communication memory 52 and the communication chip 53 may be different.

The operation panel 3 includes the display panel 31, the operation reception portion 32 and a RAM 33 which stores display image data. Even in the operation panel 3, voltages necessary for driving the devices such as the display panel 31, the operation reception portion 32 and the RAM 33 may be different.

The description with reference to FIG. 2 is an example, and another type of printed circuit board may be provided within the printer 100. Within the main control portion 2, the engine control portion 40, the operation panel 3 and the communication portion 5, other devices may be further provided.

In order to drive the devices such as various types of CPUs, various types of memories, the image processing portion 23, the ASIC 403, the display panel 31, the operation reception portion 32 and the communication chip 53, a plurality of types of voltages such as DC 5V, 3.3V, 2.5V, 1.8V and 1.2V may be necessary. A plurality of types of drive voltages such as for a core and an I/O may need to be supplied to a CPU.

In order to generate a plurality of types of necessary direct-current voltages, the secondary power supply portion 62 includes a plurality of DC-DC converters 7. As shown in FIG. 2, in the secondary power supply portion 62, a (linear) regulator 63 may be included. Although in FIG. 2, the secondary power supply portion 62 is illustrated separately from the individual printed circuit boards, the DC-DC converter 7 for generating the voltage of a necessary magnitude may be provided within each of the printed circuit boards.

Here, the order in which voltages are applied (power supply) to the devices (elements, components, circuits and various types of ICs) and the order in which voltages are interrupted (the stop of power supply) are previously determined so that an abnormal current is prevented from flowing and that an abnormal operation is prevented from being performed. In other words, the order of the startup of the devices and the order of the stop thereof are previously determined. When a plurality of types of voltages are applied to one circuit, the order in which the voltages are applied or the order in which the voltages are interrupted may be determined. For example, in a circuit such as a CPU, when voltages are applied, it is determined that a voltage for a core is applied and that then a voltage for I/O is applied.

Within the printer 100, a power supply control circuit 8 (power supply sequence circuit) is provided. The power supply control circuit 8 controls the order in which voltages are applied to the printed circuit boards and the devices (elements, components, circuits and various types of ICs) within the printer 100 such that the voltages are applied (power supply) in a predetermined order. The power supply control circuit 8 also controls the order in which the application of the voltages to the printed circuit boards and the devices (elements, components, circuits and various types of ICs) within the printer 100 is stopped such that the application of the voltages is stopped (the stop of the power supply) in a predetermined order.

When the main power supply switch of the printer 100 is turned on or when a power saving mode is cancelled and is brought into a normal mode (standby mode), the power supply control circuit 8 starts up the printed circuit boards and the devices within the printer 100. The power supply control circuit 8 sequentially operates the DC-DC converters 7 and the regulator 63 such that the voltages are applied in the predetermined order. In other words, the power supply control circuit 8 starts voltage generation in the DC-DC converters 7 and the regulator 63 in the predetermined order with predetermined timing.

When the main power supply switch of the printer 100 is turned off or the normal mode is transferred to the power saving mode, and thus the application of the voltages to the printed circuit boards and the devices within the printer 100 is stopped, the power supply control circuit 8 sequentially stops the DC-DC converters 7 and the regulator 63 such that the application of the voltages is stopped in the predetermined order. In other words, the power supply control circuit 8 stops the voltage generation in the DC-DC converters 7 and the regulator 63 in the predetermined order with predetermined timing.

Figure 3:
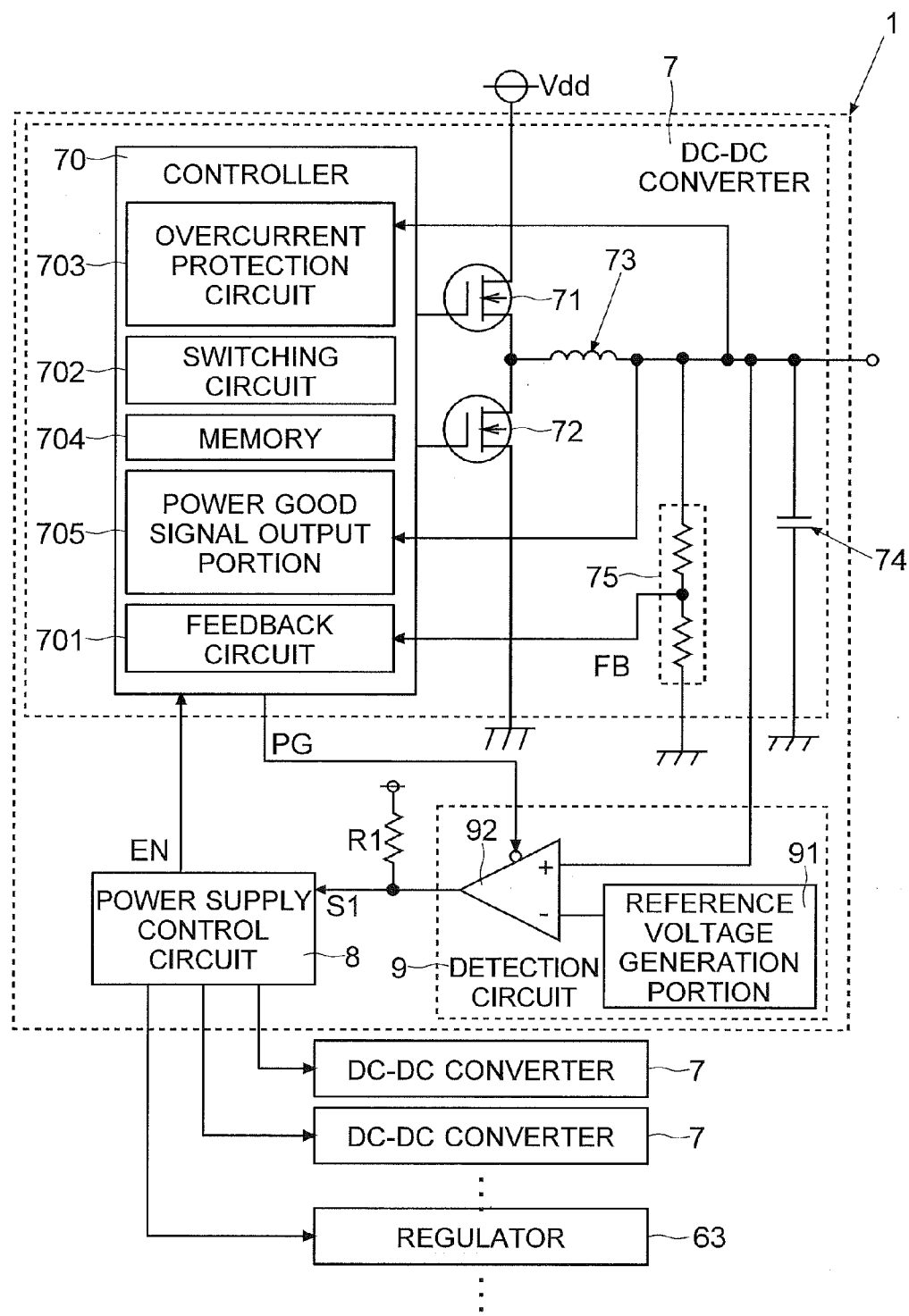
FIG. 3 is a diagram showing an example of a power supply device according to the embodiment.

The power supply control circuit 8 outputs an enable signal EN to the power supply circuits (including the DC-DC converters 7) (see FIG. 3). The power supply control circuit 8 changes the level of the enable signal EN which is input to the power supply circuit to be operated to a level that indicates "enable". The power supply circuit which receives the enable signal EN of this level is operated (outputs a voltage). On the other hand, the power supply control circuit 8 changes the level of the enable signal EN which is input to the power supply circuit whose operation is to be stopped to a level that indicates "not enable". The power supply circuit which receives the enable signal EN of this level is stopped.

(DC-DC Converter 7 and Output Ripple Voltage)

The DC-DC converter 7 and an output ripple voltage will then be described with reference to FIGS. 3 to 5.

The DC-DC converter 7 will first be described. The DC-DC converter 7 includes a controller 70, a first FET 71 (which corresponds to a switching element), a second FET 72, a coil 73, a capacitor 74 and a feedback signal generation portion 75.

As shown in FIG. 3, the drain of the first FET 71 is connected to a power supply Vdd. The gate of the first FET 71 is connected to the controller 70. The source of the first FET 71 is connected to the drain of the second FET 72. The gate of the second FET 72 is also connected to the controller 70. The source of the second FET 72 is connected to a ground. The first FET 71 and the second FET 72 are prevented from being turned on at the same time, and when one of them is on, the other is turned off.

As shown in FIG. 3, one end of the coil 73 is connected between the source of the first FET 71 and the drain of the second FET 72. One end of the capacitor 74 is connected to the other end of the coil 73. The other end of the capacitor 74 is connected to the ground. A voltage between the coil 73 and the capacitor 74 serves as an output voltage of the DC-DC converter 7 and is applied to a load.

The feedback signal generation portion 75 is connected between the coil 73 and the capacitor 74. The feedback signal generation portion 75 is a series circuit of two resistors. One end of the series circuit is connected between the coil 73 and the capacitor 74. The other end of the series circuit is connected to the ground. A voltage between both the resistors in the series circuit is input as a feedback signal FB to the controller 70. The feedback signal FB has a value corresponding to the magnitude of the output voltage. As described above, the feedback signal generation portion 75 generates the feedback signal FB indicating the magnitude of the output voltage.

The controller 70 includes a feedback circuit 701, a switching circuit 702, an overcurrent protection circuit 703, a memory 704 and a power good signal output portion 705. The switching circuit 702 performs switching (on/off) on the first FET 71 and the second FET 72. When the switching circuit 702 turns on the first FET 71, the switching circuit 702 turns off the second FET 72. By contrast, when the switching circuit 702 turns on the second FET 72, the switching circuit 702 turns off the first FET 71.

The feedback circuit 701 includes a circuit which recognizes, based on the feedback signal FB, the magnitude of the output voltage of the DC-DC converter 7. In the memory 704 within the controller 70, data which determines the magnitude of the output voltage corresponding to the value of the feedback signal FB may be stored. An AD conversion circuit is provided within the controller 70, and the output voltage of the DC-DC converter 7 is input to the AD conversion circuit, with the result that the controller 70 may recognize the magnitude of the output voltage of the DC-DC converter 7.

The feedback circuit 701 determines whether or not the output voltage of the DC-DC converter 7 is higher than a predetermined setting voltage value (a reference output voltage value, a rated output voltage value in the specifications). Then, the feedback circuit 701 performs processing for determining the pulse width (duty ratio) of a PWM signal which is input to the first FET 71 such that the output voltage of the DC-DC converter 7 maintains the setting voltage value. When the output voltage is lower than the setting voltage value, the on-duty is increased whereas when the output voltage is higher than the setting voltage value, the on-duty is reduced. The feedback circuit 701 performs the processing at regular intervals. The switching circuit 702 turns on and off the first FET 71 and the second FET 72 based on the PWM signal of the duty ratio determined by the feedback circuit 701. As described above, the controller 70 turns on and off the switching element (feedback control) based on the feedback signal FB such that the output voltage is a predetermined voltage value. Then, the controller 70 controls the output voltage of the DC-DC converter 7.

The overcurrent protection circuit 703 stops the DC-DC converter 7 when the output current (output voltage) of the DC-DC converter 7 is equal to or more than a predetermined upper limit value (a current value which is detected by the overcurrent protection circuit 703 as an overcurrent). Specifically, when the overcurrent protection circuit 703 detects that the output current of the DC-DC converter 7 is equal to or more than the upper limit value, the overcurrent protection circuit 703 keeps the first FET 71 in an off-state (keeps the second FET 72 in an on-state).

The power good signal output portion 705 outputs a power good signal PG for notifying that the DC-DC converter 7 is started up without any problem. The power good signal output portion 705 is a circuit which changes the level of a signal when the output voltage value of the DC-DC converter 7 reaches the setting voltage value (the reference output voltage value, the rated output voltage value in the specifications). For example, the power good signal output portion 705 turns the power good signal PG low when the operation of the DC-DC converter 7 is started whereas the power good signal output portion 705 turns the power good signal PG high when the output voltage of the DC-DC converter 7 is started up.

The DC-DC converter often includes the overcurrent protection circuit. The upper limit value in the overcurrent protection cannot often be changed. A DC-DC converter which can change the upper limit value may be expensive. When the coil 73 is selected so as to correspond to the upper limit value, in terms of the magnitude of a current supplied to a load (current value at the time of an actual operation) and the output ripple voltage, the coil 73 is larger than necessary and is expensive.

Hence, in the power supply device 1, in terms of cost reduction and circuit miniaturization, the coil 73 whose allowable current value is lower than the upper limit value is used (selected) for the DC-DC converter 7. Here, the allowable current value is a value in the specifications of the coil 73, and one of a current value (temperature increase allowable current value) determined such that when a current beyond this current is passed, a damage caused by heating occurs and a current value (direct-current superimposition allowable current value) in which the lowering of an inductance is increased that is lower is treated as the allowable current value (one of them that is higher may be treated).

When the coil 73 whose allowable current value is lower than the upper limit value is selected, a current having such a magnitude that the allowable current value is exceeded but the overcurrent protection circuit 703 is not operated may flow continuously. For example, when printing is continued for a long period of time, and thus a state where the rate of utilization of the circuits is high is continued, the DC-DC converter 7 for supplying power to the main control portion 2 can be continuously in a state where the load current (output current) is high.

When the state where the load current exceeds the allowable current value is continued, the temperature of the coil 73 is easily increased. Then, the inductance is lowered. When the inductance is lowered, a current easily flows through the coil 73. In this way, the output ripple voltage of the DC-DC converter 7 is increased.

Here, an increase in the temperature of the coil, a variation in the inductance and a variation in the output ripple current will be described with reference to FIGS. 4 and 5. A general relationship between the temperature and inductance of the coil will first be described with reference to FIG. 4.

Figure 4:
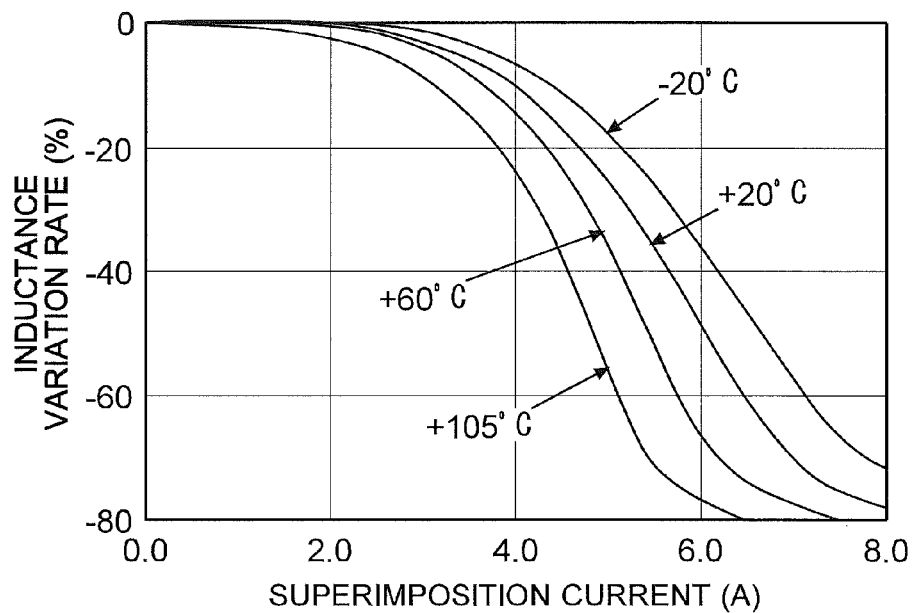
FIG. 4 is a graph showing an example of an variation in the inductance of a coil.
Figure 5:
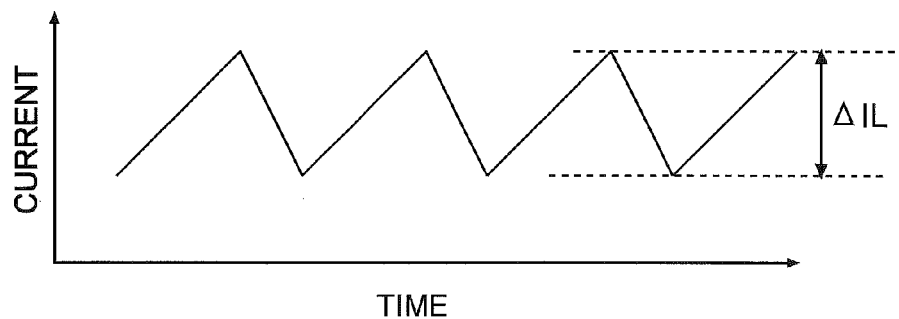
FIG. 5 is a diagram showing an example of an output ripple current.

As shown in FIG. 4, as a higher current flows through the coil, the inductance is more likely to be lowered. As shown in FIG. 4, there is a tendency that as the temperature is increased, the inductance is more likely to be lowered. Since as the inductance is lowered, the impedance is lowered, as the inductance is lowered, a high current is more likely to flow. As a higher current flows, Joule heat generated is increased, with the result that the temperature is much more likely to be increased. Then, when a certain amount of current is reached, magnetic saturation occurs. When the current flows until the magnetic saturation occurs, an impedance component is substantially only a resistance component.

In the power supply device 1, the coil 73 whose allowable current value is about several hundreds of milliamperes to several amperes lower than the upper limit value may be adopted. When the coil 73 whose allowable current value is lower than the upper limit value is adopted, the overcurrent protection circuit 703 does not detect an overcurrent but a current in which the increasing of the temperature of the coil 73 and the lowering of the inductance proceed at an accelerated pace may flow continuously. In such a state, the coil 73 and the elements within the DC-DC converter 7 may be damaged. Hence, before the overcurrent protection circuit 703 detects an overcurrent, the operation of the DC-DC converter 7 needs to be stopped.

When the inductance is lowered, the output ripple current (the width between the maximum value and the minimum value of the output current) of the DC-DC converter is increased. FIG. 5 is a diagram showing an example of a variation in the output current of the DC-DC converter. In FIG. 5, the width of the variation (output ripple current) in the output current is represented by $\Delta IL$.

The output ripple current $\Delta IL$ can be determined, for example, by formula 1 below.

$$\Delta IL = (Vin - Vout) \times Vout / (L \times Vin \times f) \quad \text{(Formula 1)}$$

where Vin=voltage applied to the switching element,
Vout=output voltage of the DC-DC converter,
L=inductance value and
f=switching frequency of the switching element.

It is found from (formula 1) that as L of the denominator is decreased, $\Delta IL$ is increased.

The coil 73 may be selected such that the output ripple current $\Delta IL$ is about 20 to 40% (for example, 30%) of the maximum output current which is expected in an actual use.

The output ripple voltage $\Delta VL$ can also be determined, for example, by formula 2 below.

$$\Delta VL = (ESR \times Vout \times (1 - Vout/Vin)) / (L \times f) \quad \text{(Formula 2)}$$

where Vin=voltage applied to the switching element,
Vout=output voltage of the DC-DC converter,
L=inductance value,
f=switching frequency of the switching element and
ESR=equivalent direct-current resistance value of the capacitor 74 in an output portion.

As in (formula 1), it is also found from (formula 2) that as L of the denominator is decreased, $\Delta VL$ is increased.

Since the output ripple voltage is increased when the inductance is lowered by an increase in temperature, the power supply device 1 stops the DC-DC converter 7 before the overcurrent protection circuit 703 is operated.

(Power Supply Device 1)

Figure 6:
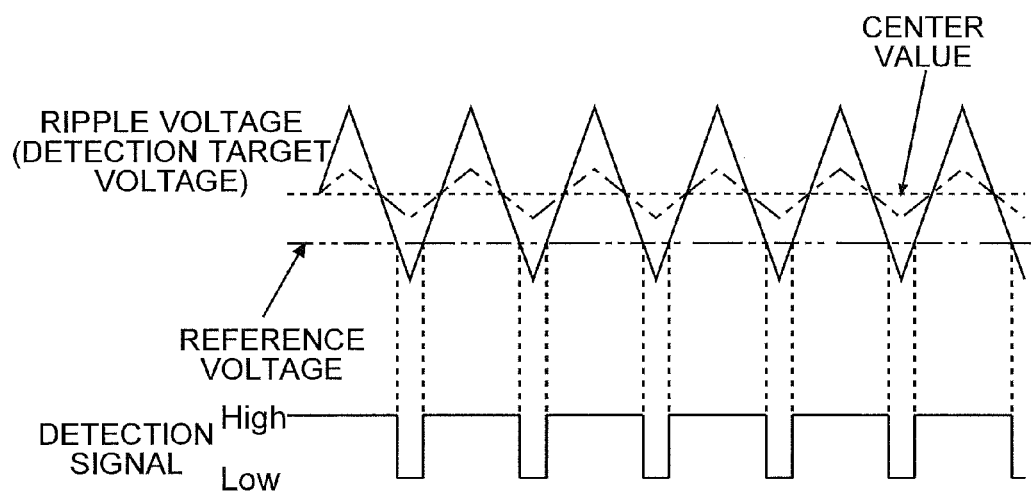
FIG. 6 is a timing chart showing a relationship between an output ripple voltage and a detection signal in the power supply device according to the embodiment.

The details of the power supply device 1 according to the embodiment will then be described with reference to FIGS. 3 and 6. FIG. 6 is a timing chart showing a relationship between an output ripple voltage and a detection signal S1 in the power supply device 1 according to the embodiment.

The power supply device 1 includes the DC-DC converter 7, the power supply control circuit 8 and a detection circuit 9. Within the printer 100, a plurality of DC-DC converters 7 are provided. Hence, the detection circuit 9 may be provided for each of a plurality of or all of the DC-DC converters 7, and the power supply control circuit 8 may be shared by the DC-DC converters 7. In the following description, an example where the detection circuit 9 is provided in one DC-DC converter 7 will be discussed.

The DC-DC converter 7 includes the first FET 71 (switching element) which is connected to the power supply Vdd, the coil 73 which is connected to the output (source) of the first FET 71, the capacitor 74 in which one end is connected to the coil 73 and the other end is connected to the ground and the controller 70 which controls the turning on and off of the first FET 71 to control the output voltage.

The detection circuit 9 includes a reference voltage generation portion 91 which generates a reference voltage and a comparator 92 to which the reference voltage and the output voltage of the DC-DC converter 7 (the voltage between the coil 73 and the capacitor 74) are input and which outputs the detection signal S1. The detection signal S1 is a signal whose level (high and low) is changed depending on whether or not the output voltage of the DC-DC converter 7 is less than the reference voltage.

The reference voltage generation portion 91 may be a DA converter which outputs a voltage having a magnitude of the predetermined reference voltage based on an instruction from the power supply control circuit 8 or the main control portion 2. The reference voltage generation portion 91 may be a series circuit of resistors. In this case, the series circuit is connected between an unillustrated power supply and the ground. The resistance values (voltage division ratio) of the resistors are set such that the voltage value between both the resistors is the reference voltage.

The output voltage of the DC-DC converter 7 is input to one terminal (+ terminal) of the comparator 92. The reference voltage is input to the other terminal (− terminal) of the comparator 92. The comparator 92 shown in FIG. 3 is an open collector type, and its output is pulled up by the resistor R1.

The detection signal S1 output from the comparator 92 will be described with reference to FIGS. 3 and 6. In the timing chart on the upper side of FIG. 6, an example of the output voltage waveform of the DC-DC converter 7 when the inductance is lowered is represented by solid lines, and an example of the output voltage waveform of the DC-DC converter 7 in a state where the lowering of the inductance is reduced and where the inductance does not exceed the reference voltage is represented by alternate long and short dashed lines. The timing chart on the lower side of FIG. 6 shows an example of the waveform of the detection signal S1. In FIG. 6, the level of the reference voltage is represented by an alternate long and two short dashes line.

In the circuit shown in FIG. 3, the output voltage of the DC-DC converter 7 is input to the + terminal of the comparator 92. Hence, as shown in FIG. 6, in the period during which the output voltage of the DC-DC converter 7 is equal to or more than the reference voltage, the level of the output signal (the detection signal S1) of the comparator 92 is high. On the other hand, in the period during which the output voltage of the DC-DC converter 7 is less than the reference voltage, the level of the detection signal S1 is low. In a state where the inductance of the coil 73 is lowered, the output voltage of the DC-DC converter 7 may exceed the reference voltage. Here, the change (the change between the high level and the low level) of the level of the detection signal S1 is repeatedly performed. Then, the period of the change of the detection signal S1 is substantially the same as that of the output ripple voltage. On the other hand, when the output ripple voltage is reduced, and thus the output voltage of the DC-DC converter 7 is prevented from being less than the reference voltage, the level of the detection signal S1 is kept high.

For example, in an experiment, the waveform of the output ripple voltage when a current of the allowable current value is continuously passed through the coil 73 for a given period of time is measured, the average minimum value of the voltage in the waveform is determined and thus a value obtained by adding a value corresponding to a margin to the average minimum value may be assumed to be the reference voltage. The temperature of the coil 73 is set to a temperature obtained by lowering the heat resistance temperature of the coating of the coil 73 only by a value corresponding to a margin, the waveform of the output ripple voltage when the maximum output current which is expected in an actual use is passed through a load is measured, the average minimum value of the voltage in the waveform is determined and thus a value obtained by adding the value corresponding to the margin to the average minimum value may be assumed to be the reference voltage.

In the example of FIG. 6, the detection circuit 9 detects whether or not the minimum value of the output ripple voltage (the output voltage) is less than the reference voltage. However, whether or not the output ripple voltage is increased may be detected by whether or not the maximum value of the output ripple voltage exceeds the reference voltage. In this case, the reference voltage is set to a value which is higher than the central value between the maximum value and the minimum value of the output ripple voltage. A voltage obtained by adding, to the central value, the absolute value of a difference between the reference voltage and the central value when the reference voltage is set less than the central value (see FIG. 6) may be set to the reference voltage.

(Flow of Processing for Stopping the DC-DC Converter 7 in the Power Supply Device 1)

An example of the flow of the stop of the DC-DC converter 7 in the power supply device 1 according to the embodiment will then be described with reference to FIG. 7.

Figure 7:
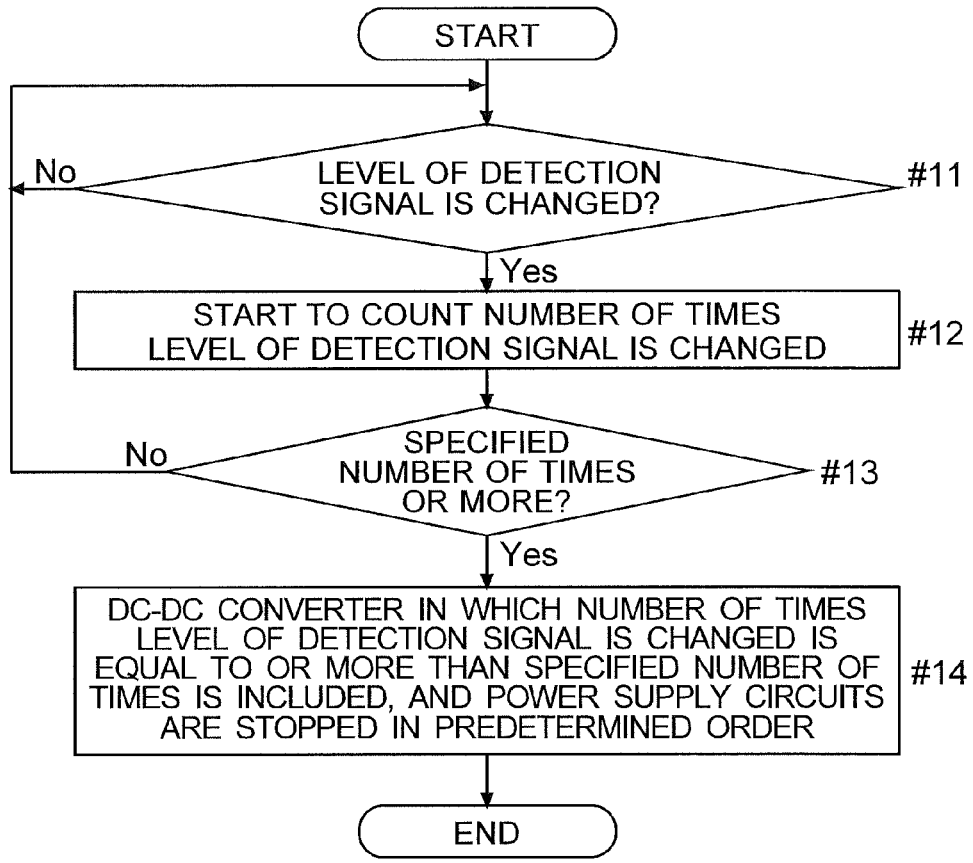
FIG. 7 is a flowchart showing an example of the flow of the stop of a DC-DC converter in the power supply device according to the embodiment.

The start of FIG. 7 is a time when the output voltage rises (the level of the power good signal PG is changed from the level at the time of the start of the operation) after the operation of the DC-DC converter 7 is started.

After the level of the power good signal PG is changed from the level at the time of the start of the operation, the power supply control circuit 8 continues to check whether or not the level of the detection signal S1 is changed (step #11, no in step #11→step #11). When the level of the detection signal S1 is changed (yes in step #11), the power supply control circuit 8 sets a count value to "1", and starts to count the number of times the level of the detection signal S1 is changed (step #12). A counter may be provided in the power supply control circuit 8 or a count value may be stored in a memory within an IC serving as the power supply control circuit 8.

The power supply control circuit 8 checks whether or not the number of times the level of the detection signal S1 is changed within a detection period is equal to or more than a specified number of times (step #13). In other words, the power supply control circuit 8 detects, based on the output ripple voltage, that the coil 73 is in an overload state.

Here, the output ripple voltage of the DC-DC converter 7 may be temporarily increased by a variation in the load current. In order to exclude such a temporary large output variation, whether or not the number of times the level of the detection signal S1 is changed within the detection period is equal to or more than the specified number of times is checked.

The length of the detection period can be determined as necessary. However, the power supply control circuit 8 sets, to the detection period, a time which is equal to or more than a response period in feedback control. When the detection period is shorter than the response period in the feedback control, the power supply control circuit 8 is more likely to stop the DC-DC converter 7 even when it is not necessary to do so. For example, the power supply control circuit 8 responses to a relatively large variation in the load current to erroneously stop the DC-DC converter 7. Hence, the detection period is set to at least the length of an integral multiple of the response period in the feedback period.

The specified number of times can be determined as necessary. Here, a switching period is shorter than the response period in the feedback control. The specified number of times is set equal to or more than two. The specified number of times can be determined based on a division value obtained by diving the detection period by the switching period (the period of the output ripple voltage) of the controller 70. When the output ripple voltage is increased by the lowering of the inductance, the output voltage may exceed the reference voltage in the period of a variation in the output ripple voltage. In a relationship in which the division value is equal to or more than two, the response period in the feedback control is longer than the switching period. For example, in a case where the inductance of the coil is lowered, the response period is 10 μs and the switching frequency is 1 MHz (period=1 μs), when the detection period is set to 10 μs, the number of times the detection signal S1 is changed can be predicted to be about 9 or 10. When the detection period is not divisible in the division, all digits to the right of the decimal point in the division value obtained may be discarded. The specified number of times is determined based on the division value, and thus it is possible to accurately detect that the increase in the output ripple voltage is based on the lowering of the inductance.

As shown in FIG. 3, a plurality of power supply circuits such as the DC-DC converter are connected to the power supply control circuit 8. The power supply control circuit 8 stops only the DC-DC converter 7 in which the number of times the level of the detection signal S1 is changed within the detection period is equal to or more than the specified number of times, and this may cause an abnormal current or an abnormal operation of the printer 100. Hence, when the number of times the level of the detection signal S1 is changed is equal to or more than the specified number of times (yes in step #13), the power supply control circuit 8 stops the DC-DC converter 7 while stopping a plurality of power supply circuits connected in a predetermined order (step #14→end).

Hence, the power supply control circuit 8 sequentially stops a plurality of power supply circuits connected (under management) including the DC-DC converter 7 in which the number of times the level of the detection signal S1 is changed within the detection period is equal to or more than the specified number of times. In this way, it is possible to stop the DC-DC converter 7 and the printer 100 without any problem. On the other hand, when it is not equal to or more than the specified number of times (no in step #13), the flow is returned to step #11.

(Flow of Processing when the Operation of the DC-DC Converter 7 is Started)

Figure 8:
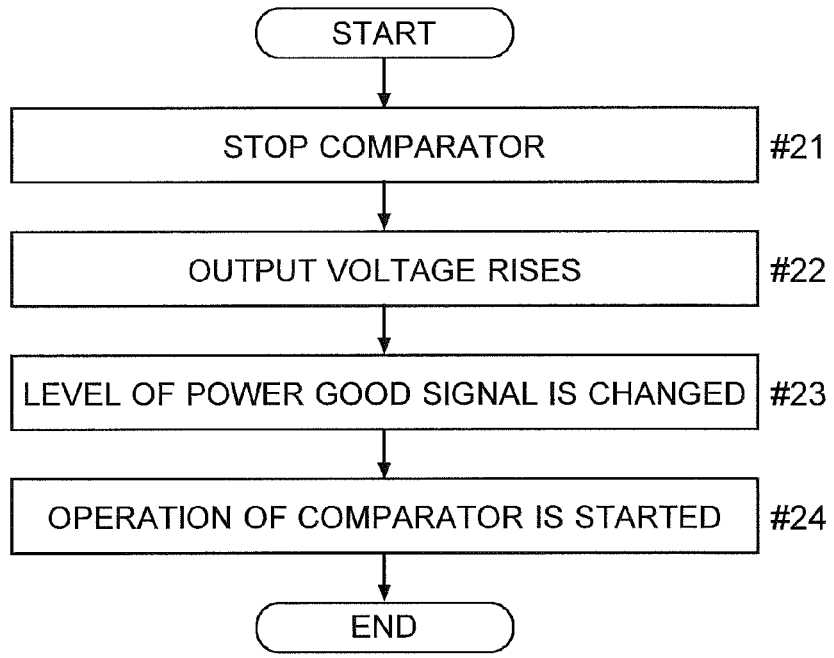
FIG. 8 is a flowchart showing an example of the flow of processing when the operation of the DC-DC converter according to the embodiment is started.

An example of the flow of processing when the operation of the DC-DC converter 7 is started will then be described with reference to FIGS. 3 and 8. FIG. 8 is a flowchart showing an example of the flow of the processing when the operation of the DC-DC converter 7 according to the embodiment is started.

The controller 70 can control the operation of the comparator 92. The comparator 92 inputs a signal to a terminal provided in the comparator 92. When the signal whose level indicates that the operation needs to be performed is input from the controller 70, the comparator 92 is operated. On the other hand, when the signal whose level indicates that the operation needs to be stopped is input from the controller 70, the comparator 92 is stopped. In the power supply device 1 shown in FIG. 3, when the comparator 92 is kept in a stopped state, the level of the detection signal S1 is maintained.

Specifically, the controller 70 inputs the power good signal PG to the terminal of the comparator 92. While the level of the power good signal PG is the level before the output voltage of the DC-DC converter 7 rises, the comparator 92 is stopped. When the level of the power good signal PG is changed to the level indicating that the output voltage of the DC-DC converter 7 rises, the operation of the comparator 92 is started.

Here, in the rising period during which the output voltage rises to the setting voltage value after the operation of the DC-DC converter 7 is started, the output ripple voltage may be increased or the output voltage may exceed the reference voltage a plurality of times. In the rising period of the DC-DC converter 7, when the comparator 92 is operated, the power supply control circuit 8 may erroneously stop the DC-DC converter 7. Hence, when the operation of the DC-DC converter 7 is started, the power supply device 1 (the printer 100) prevents the power supply control circuit 8 from erroneously stopping the DC-DC converter 7.

The flow of the processing will be described with reference to FIG. 8. The start of FIG. 8 is a time when the operation of the DC-DC converter 7 is started.

The controller 70 first stops the comparator 92 (the detection circuit 9) with the power good signal PG (step #21). Then, the output voltage of the DC-DC converter 7 reaches the setting voltage value (the rated output voltage, the reference output voltage in the specifications), and the output voltage rises (step #22). Consequently, the power good signal output portion 705 changes the level of the power good signal PG to the level indicating that the output voltage rises (step #23). Based on the change of the level of the power good signal PG from the controller 70, the comparator 92 starts the operation (step #24→end). Then, the present flow is completed. After the completion of the present flow, the flow of FIG. 7 is started.

When the inductance is lowered by an increase in the temperature of the coil 73, the ripple of the voltage (the output voltage of the DC-DC converter 7) between the coil 73 and the capacitor 74 is increased. Then, when the coil 73 which corresponds to the current value at the time of the actual operation is adopted, the upper limit value of the overcurrent protection circuit 703 may be excessively high for the adopted coil 73.

Hence, the power supply device 1 according to the embodiment includes: the DC-DC converter 7 that includes the switching element (the first FET 71) which is connected to the power supply, the coil 73 which is connected to the output of the switching element, the capacitor 74 in which one end is connected to the coil 73 and in which the other end is connected to the ground and the controller 70 which controls the turning on and off of the switching element (the first FET 71) to control the output voltage; the detection circuit 9 to which the output voltage of the DC-DC converter 7 that is the voltage between the coil 73 and the capacitor 74 is input and which outputs the detection signal S1 whose level is changed depending on whether or not the output voltage of the DC-DC converter 7 is less than the reference voltage; and the power supply control circuit 8 to which the detection signal S1 is input and which stops the DC-DC converter 7 when the number of times the level of the detection signal S1 is changed within the predetermined detection period is equal to or more than the specified number of times.

Whether or not the inductance of the coil 73 is lowered by an increase in the temperature such that the DC-DC converter 7 needs to be stopped (whether or not an overload is applied to the coil 73) can be determined based on the magnitude of the output ripple voltage of the DC-DC converter 7. In other words, whether or not an abnormality (an increase in the temperature, an overcurrent) occurs in the coil 73 can be checked based on the magnitude of the output ripple voltage. In this way, it is possible to stop the operation of the DC-DC converter 7 before the coil 73 is damaged (before the overcurrent protection circuit 703 provided in the DC-DC converter 7 functions). In other words, it is possible to detect the abnormality of the DC-DC converter 7, stop the DC-DC converter 7 and protect the elements of the DC-DC converter 7 such as the coil 73 without depending on the overcurrent protection circuit 703 of the DC-DC converter 7. Furthermore, since the coil 73 which exceeds the specifications does not need to be applied, it is possible to prevent the size and cost of the power supply device 1 from being increased. It is also possible to provide the power supply device 1 which is unlikely to have a failure and which is highly reliable.

Until the output voltage (the output voltage) of the DC-DC converter 7 is increased and is then stabilized (the output rises) after the start of the drive of the DC-DC converter 7, the state where the output ripple voltage is high may be continued, and the output voltage may exceed the reference voltage a plurality of times. Hence, the controller 70 does not make the detection circuit 9 change the level of the detection signal S1 until the output voltage of the DC-DC converter 7 reaches a predetermined magnitude after the operation of the DC-DC converter 7 is started. In this way, it is possible to avoid erroneously recognizing, as an abnormality (an increase in the temperature, an overcurrent) in the coil 73, a variation in the voltage during the period until the output voltage is stabilized after the start of the drive of the DC-DC converter 7. Hence, during the period until the output voltage is stabilized after the start of the drive, the DC-DC converter 7 is prevented from being stopped without necessity.

The detection circuit 9 includes the reference voltage generation portion 91 which generates the reference voltage and the comparator 92 to which the reference voltage and the output voltage of the DC-DC converter 7 are input and which outputs the detection signal S1. In this way, it is possible to simplify the detection circuit 9 and reduce the cost and size thereof. Hence, it is possible to prevent the manufacturing cost and size of the power supply device 1 from being increased.

The power supply device 1 (the DC-DC converter 7) includes the feedback signal generation portion 75 which generates the feedback signal FB indicating the magnitude of the output voltage. The controller 70 turns on and off the switching element (the first FET 71) based on the feedback signal FB such that the output voltage is a predetermined voltage value. The power supply control circuit 8 sets, as the detection period, a time which is equal to or more than the response period in the feedback control and sets, as the specified number of times, a value based on a division value obtained by dividing the detection period by the switching period of the switching element.

In this way, it is possible to prevent the power supply control circuit 8 from erroneously stopping the DC-DC converter 7 based on a temporary large variation in the current (voltage) caused by the feedback control. Hence, it is possible to prevent the DC-DC converter 7 from being stopped without necessity. Even when a variation in the switching frequency of the DC-DC converter 7 is produced due to a mode, the appropriate number of times corresponding to the switching frequency is set as the specified number of times.

The order in which the power supply of the device is turned off may be determined, for example, as follows: the application of a voltage for the I/O of a CPU is stopped, and then the application of a voltage for the core of the CPU is stopped. When only part of voltages is stopped without following the order, an erroneous operation may be performed on a printed circuit board or a circuit or an abnormal current is passed through a printed circuit board or a circuit. Hence, the power supply control circuit 8 is connected to a plurality of power supply circuits including the DC-DC converter 7, and stops the power supply circuits in a predetermined order when the number of times the level of the detection signal S1 is changed within the detection period is equal to or more than the specified number of times. In this way, it is possible to safely stop the DC-DC converter 7 such that an abnormality is prevented from occurring in a printed circuit board or a circuit.

The DC-DC converter 7 includes the overcurrent protection circuit 703 which detects that the output current exceeds the predetermined upper limit value. The allowable current value of the coil 73 used is less than the upper limit value. In this way, even when the coil 73 which corresponds to the upper limit value is selected, and the coil 73 which corresponds to the current value at the time of the actual operation is adopted because the specifications are exceeded, an overload current is prevented from being continuously passed to the coil 73, with the result that it is possible to protect the elements within the DC-DC converter 7. Since the coil 73 which exceeds the specifications is not adopted, it is possible to prevent the size and cost of the power supply device 1 from being increased.

The image forming apparatus includes the power supply device 1 according to the embodiment. In this way, even when the coil 73 which corresponds to the current value at the time of the actual operation is selected, it is possible to provide the image forming apparatus in which the elements within the DC-DC converter 7 are protected without depending on the overcurrent protection circuit 703. Hence, it is possible to provide the image forming apparatus in which the power supply device 1 is unlikely to have a failure and which is highly reliable. Since the power supply device 1 to which elements exceeding the specifications are not applied is included, it is possible to provide the image forming apparatus in which its size and cost are reduced.

Although the embodiment of the present disclosure is described, the scope of the present disclosure is not limited to this embodiment, and various modifications are possible without departing from the spirit of the disclosure.

What is claimed is:

1. A power supply device comprising:
   a DC-DC converter that includes:
      a switching element which is connected to a power supply;
      a coil which is connected to an output of the switching element;
      a capacitor in which one end is connected to the coil and in which the other end is connected to a ground; and
      a controller which controls turning on and off of the switching element to control an output voltage that is a voltage between the coil and the capacitor;
   a detection circuit to which the output voltage is input and which outputs a detection signal whose level is changed depending on whether or not the output voltage is less than a reference voltage; and a power supply control circuit to which the detection signal is input and which stops the DC-DC converter when the number of times the level of the detection signal is changed within a predetermined detection period is equal to or more than a specified number of times;

wherein the DC-DC converter includes a feedback signal generation portion which generates a feedback signal indicating a magnitude of the output voltage, the controller turns on and off the switching element based on the feedback signal such that the output voltage is a predetermined voltage value, and the power supply control circuit sets, as the detection period, a time which is equal to or more than a response period in feedback control, and sets, as the specified number of times, a value based on a division value obtained by dividing the detection period by a switching period of the switching element.

2. The power supply device according to claim 1, wherein the controller does not make the detection circuit change the level of the detection signal until the output voltage reaches a predetermined magnitude after an operation of the DC-DC converter is started.

3. The power supply device according to claim 1, wherein the detection circuit includes a reference voltage generation circuit which generates the reference voltage and a comparator to which the reference voltage and the output voltage are input and which outputs the detection signal.

4. A power supply device comprising:

a DC-DC converter that includes:

a switching element which is connected to a power supply;

a coil which is connected to an output of the switching element;

a capacitor in which one end is connected to the coil and in which the other end is connected to a ground; and a controller which controls turning on and off of the switching element to control an output voltage that is a voltage between the coil and the capacitor;

a detection circuit to which the output voltage is input and which outputs a detection signal whose level is changed depending on whether or not the output voltage is less than a reference voltage; and a power supply control circuit to which the detection signal is input and which stops the DC-DC converter when the number of times the level of the detection signal is changed within a predetermined detection period is equal to or more than a specified number of times;

wherein the power supply control circuit is connected to a plurality of power supply circuits including the DC-DC converter, and stops the plurality of power supply circuits in a predetermined order when the number of times the level of the detection signal is changed within the detection period is equal to or more than the specified number of times.

5. The power supply device according to claim 1, wherein the DC-DC converter includes an overcurrent protection circuit which detects that an output current exceeds a predetermined upper limit value, and an allowable current value of the coil used is less than the upper limit value.

6. The power supply device according to claim 1, wherein the detection circuit detects whether or not a minimum value of the output voltage is less than the reference voltage.

7. An image forming apparatus comprising the power supply device according to claim 1.

8. A method of controlling a power supply device, the method comprising:

connecting a switching element to a power supply;

connecting a coil to an output of the switching element;

connecting one end of a capacitor to the coil and connecting the other end to a ground;

controlling turning on and off of the switching element to control an output voltage that is a voltage between the coil and the capacitor;

changing a level of a detection signal depending on whether or not the output voltage is less than a reference voltage; and stopping a DC-DC converter including the switching element, the coil and the capacitor when the number of times the level of the detection signal is changed within a predetermined detection period is equal to or more than a specified number of times;

wherein the DC-DC converter includes a feedback signal generation portion which generates a feedback signal indicating a magnitude of the output voltage, the controller turns on and off the switching element based on the feedback signal such that the output voltage is a predetermined voltage value, and the power supply control circuit sets, as the detection period, a time which is equal to or more than a response period in feedback control, and sets, as the specified number of times, a value based on a division value obtained by dividing the detection period by a switching period of the switching element.

9. The power supply device according to claim 4, wherein the controller does not make the detection circuit change the level of the detection signal until the output voltage reaches a predetermined magnitude after an operation of the DC-DC converter is started.

10. The power supply device according to claim 4, wherein the detection circuit includes a reference voltage generation circuit which generates the reference voltage and a comparator to which the reference voltage and the output voltage are input and which outputs the detection signal.

11. The power supply device according to claim 4, wherein the DC-DC converter includes an overcurrent protection circuit which detects that an output current exceeds a predetermined upper limit value, and an allowable current value of the coil used is less than the upper limit value.

12. The power supply device according to claim 4 wherein the detection circuit detects whether or not a minimum value of the output voltage is less than the reference voltage.

13. An image forming apparatus comprising the power supply device according to claim 4.

* * * * *